No. 769,164. PATENTED SEPT. 6, 1904.
A. IPPENDORF.
APPARATUS FOR PRODUCING PYRO-ACETIC SPIRIT.
APPLICATION FILED JULY 1, 1902.
NO MODEL.
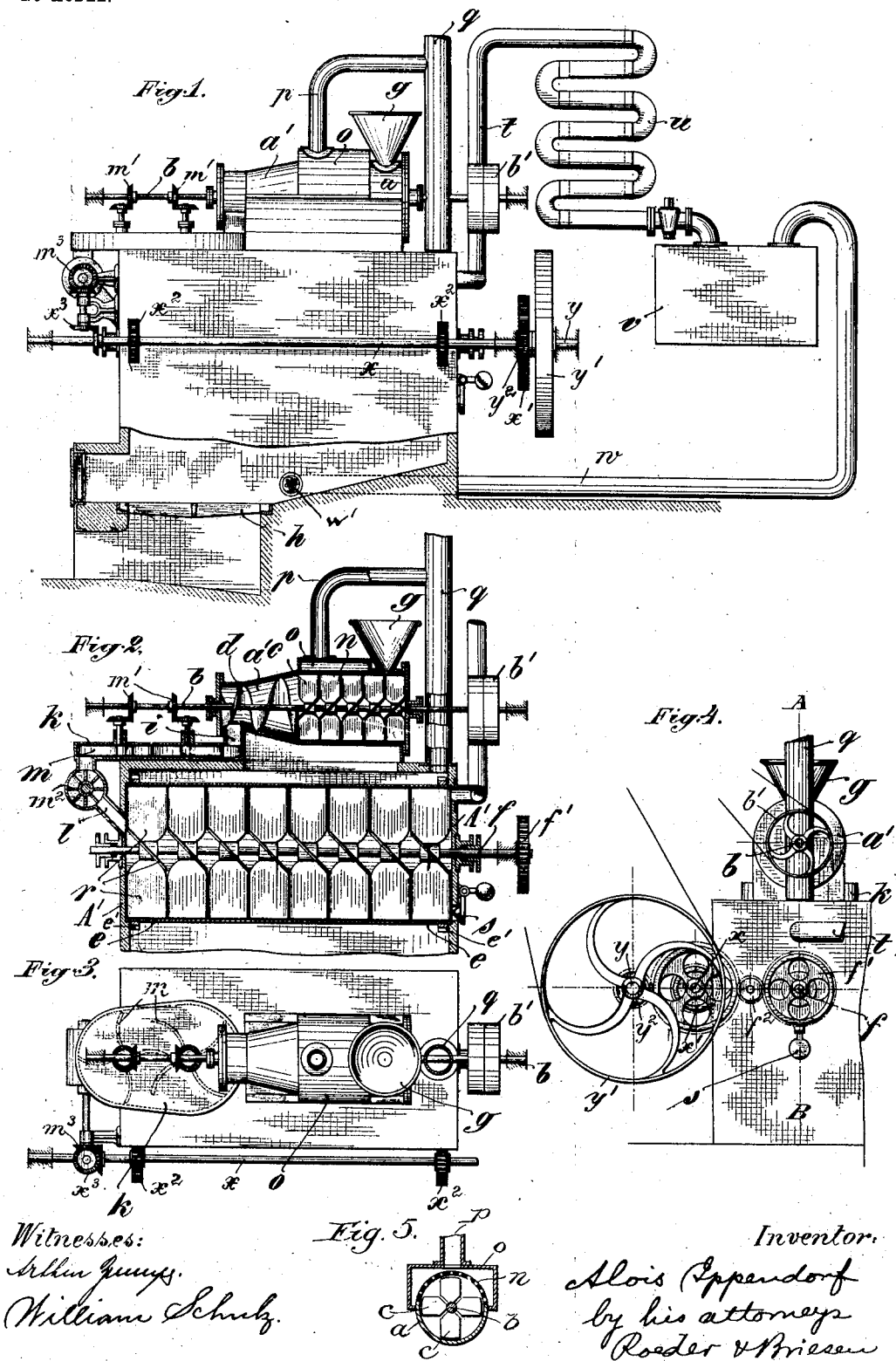
Witnesses:
Arthur Grupp.
William Schulz.
Inventor:
Alois Ippendorf
by his attorneys
Roeder & Briesen No. 769,164.                                              Patented September 6, 1904.

UNITED STATES PATENT OFFICE.

ALOIS IPPENDORF, OF DÜSSELDORF, GERMANY.

APPARATUS FOR PRODUCING PYRO-ACETIC SPIRIT.

SPECIFICATION forming part of Letters Patent No. 769,164, dated September 6, 1904.

Application filed July 1, 1902. Serial No. 113,950. (No model.)

*To all whom it may concern:*

Be it known that I, ALOIS IPPENDORF, a citizen of Germany, residing as Düsseldorf, Germany, have invented new and useful Improvements in Apparatus for the Production of Pyro-Acetic Spirit, of which the following is a specification.

My invention relates to an apparatus for the production of pyro-acetic spirit from sawdust. The apparatus consists of two separate compartments, the first of which serves to preheat the wood, while in the second the pyro-acetic spirit and residual products are produced and led to the condenser.

In the accompanying drawings, Figure 1 is a side view of my improved apparatus, partly in section; Fig. 2, a longitudinal section on line A B, Fig. 4; Fig. 3, a plan; Fig. 4, a front view, partly broken away; and Fig. 5, a section through the upper part of the economizer.

The letter $a$ represents a cylindrical vessel or economizer having a frusto-conical end $a'$ and supported by the framework of the apparatus in suitable manner. The vessel $a$ is charged through funnel $g$ and is perforated at its upper side, as at $n$, the perforated section being surrounded by a cover $o$, shown to be made integral with the vessel $a$, and from which a tube $p$ leads to the chimney $q$. The tube $p$ carries the steam and a portion of the volatile gases evolved from the heated sawdust in a vessel $a$ to the chimney.

Within the vessel $a$ is adapted to rotate in suitable bearings a shaft $b$, driven by pulley $b'$. That section of shaft $b$, which is inclosed by the cylindrical portion of vessel $a$, carries a number of inclined blades or wings $c$, while that section of the shaft which is contained within the conical portion $a'$ of the vessel $a$ carries a conveyer or worm $d$. Both the wings, as well as the worm, extend close to the inner face of the receptacle. The rotation of pulley $b'$ will thus rotate the shaft $b$, together with its stirrers $c$, and worm $d$.

The vessel $a$ is connected by channels $i\ k\ l$ to the interior of a rotatable drum or retort $e$, open at both ends and inclosed by frame $A'$. Within the channel $k$ are mounted two feed-wheels $m$, driven by bevel-gears $m'$ from shaft $b$. The channel $l$ contains a shovel-wheel $m^2$, driven in manner hereinafter described.

Within the retort $e$ is adapted to rotate in a direction opposite to the motion of the drum a shaft $f$, carrying a suitable number of inclined spaced wings or blades $r$. These blades are mounted upon the shaft $f$ from end to end, so that they extend along the entire length of the retort and effect a uniform feed of the sawdust. Both the drum $e$ and shaft $f$ receive motion from power-shaft $y$, mounted in suitable bearings and driven by pulley $y'$. The shaft $y$ carries a toothed wheel $y^2$, that intergears with a toothed wheel $x'$, fast on shaft $x$. Upon shaft $x$ are mounted two toothed wheels $x^2$, which mesh into two toothed wheels $e'$, fast on drum $e$. Beveled gears $x^3\ m^3$ transmit motion from shaft $x$ to the shaft of the wheel $m^2$. Shaft $f$ carries a toothed wheel $f'$, that receives motion from toothed wheel $x'$ by transmission-wheel $f^2$.

A tube $t$ connects the interior of retort $e$ with a worm $u$, that leads to the condenser $v$. The retort $e$ and the lower part of vessel $a$ are inclosed by the framework $A'$, forming part of an oven. The framework $A'$ has a discharge-opening opposite the outlet end of the retort. This opening is adapted to be closed by a pivoted door $s$, held normally in its closed position by a counterweight $s'$.

By mounting a number of spaced wings $r$ upon shaft $f$, from end to end of the retort, the gases rising from the sawdust may pass freely and quickly between the wings to outlet-tube $t$. In this way the gases are not apt to become decomposed, as would be the case if they were retained within the retort for an undue length of time. The heating-gases rising from gate $h$ flow around retort $e$ and vessel $a$ and escape through the chimney $q$. A pipe $w$, having strainers $w'$, connects the condenser with the fireplace of the oven.

The operation is as follows: The sawdust, filled into funnel $g$, drops into vessel $a$ and is thoroughly worked through and fed forward by wings $c$ and conveyer $d$. Along its course the sawdust is preheated to any desired degree. The steam and gases generated in vessel $a$ escape through pipe $p$ into chimney $q$. The sawdust then enters channel $i$ and is fed through channels $k$ and $l$ by feed-wheels $m$ $m^2$ to retort $e$. Within the retort the sawdust is again thoroughly worked through and is fed along the retort and out of the open door $s$ by the blades $r$. During its passage through the retort the sawdust is heated to the degree necessary for distillation. The residuum coal is removed through door $s$, while the gases escape through pipe $t$ into worm $u$ and are condensed within the condenser $v$. In the condenser the pyroligneous acid, tar, and pyroacetic spirit remain while the gases are conducted to the fireplace through pipe $w$.

What I claim is—

In an apparatus for producing pyro-acetic acid, a cylindrical vessel having a frusto-conical end, rotatable wings within the cylindrical section of the vessel, a rotatable worm within the coniform section of the vessel, means for heating the vessel, a rotatable retort communicating with the vessel, a rotatable shaft within the retort, and inclined blades mounted upon the shaft, substantially as specified.

Signed by me at Düsseldorf, Germany, this 3d day of May, 1902.

ALOIS IPPENDORF.

Witnesses:
WILLIAM ESSENWEIN,
PETER LIEBER.